United States Patent
Shinozaki et al.

(10) Patent No.: US 11,518,274 B2
(45) Date of Patent: Dec. 6, 2022

(54) BATTERY COOLING SYSTEM

(71) Applicant: SUBARU CORPORATION, Tokyo (JP)

(72) Inventors: Tomoki Shinozaki, Tokyo (JP); Ringo Shimada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 70 days.

(21) Appl. No.: 17/060,564

(22) Filed: Oct. 1, 2020

(65) Prior Publication Data

US 2021/0155118 A1    May 27, 2021

(30) Foreign Application Priority Data

Nov. 27, 2019   (JP) .............................. JP2019-213929
Jul. 22, 2020   (JP) .............................. JP2020-125651

(51) Int. Cl.
*B60L 58/26*    (2019.01)
*H01M 10/613*   (2014.01)
(Continued)

(52) U.S. Cl.
CPC ........... *B60L 58/26* (2019.02); *H01M 10/486* (2013.01); *H01M 10/613* (2015.04); *H01M 10/625* (2015.04); *H01M 10/633* (2015.04); *H01M 10/6563* (2015.04); *B60K 6/28* (2013.01); *B60Y 2200/91* (2013.01); *B60Y 2200/92* (2013.01); *B60Y 2306/05* (2013.01); *H01M 2220/20* (2013.01)

(58) Field of Classification Search
CPC . B60K 6/28; B60L 2240/34; B60L 2240/545; B60L 2240/80; B60L 58/26; B60Y 2200/91; B60Y 2200/92; B60Y 2306/05; H01M 10/486; H01M 10/613; H01M 10/625; H01M 10/633; H01M 10/635; H01M 10/6563; H01M 2220/20
See application file for complete search history.

(56) References Cited

U.S. PATENT DOCUMENTS

2006/0196954 A1* 9/2006 Okuda ................ H01M 10/625
                                                     236/49.3

FOREIGN PATENT DOCUMENTS

JP         2018-095061 A      6/2018

* cited by examiner

*Primary Examiner* — Adam A Arciero
(74) *Attorney, Agent, or Firm* — McGinn I.P. Law Group, PLLC.

(57) ABSTRACT

A battery cooling system includes a cooling fan that takes in inside air of a vehicle cabin to an intake passage and sends the air to a battery communicating with the vehicle cabin through the intake passage, a battery temperature sensor that detects a temperature of the battery, an intake air temperature sensor that is disposed in the intake passage and detects a temperature of the air flowing through the intake passage, and a controller. The controller controls the cooling fan based on the detected temperatures. The controller performs a temperature check operation. Firstly, when the difference value between the detected temperatures is larger than zero, the controller repeats the temperature check operation. Afterward, When the difference value in the latest temperature check operation is smaller than the difference value in the previous temperature check operation and larger than zero, the controller repeats the temperature check operation.

12 Claims, 6 Drawing Sheets

(51) Int. Cl.
*H01M 10/625* (2014.01)
*H01M 10/6563* (2014.01)
*H01M 10/48* (2006.01)
*H01M 10/633* (2014.01)
*B60K 6/28* (2007.10)

BATTERY COOLING SYSTEM

CROSS-REFERENCE TO RELATED APPLICATIONS

The present application claims priority from Japanese Patent Application No. 2019-213929 filed on Nov. 27, 2019 and Japanese Patent Application No. 2020-125651 filed on Jul. 22, 2020, the entire contents of which are hereby incorporated by reference.

BACKGROUND

The disclosure relates to a battery cooling system for cooling a battery mounted on a vehicle.

A battery is mounted as a drive source on a vehicle, such as an electric vehicle and a hybrid vehicle. When excessively increased in temperature, this battery is degraded in performance and decreased in service life. For this reason, a battery cooling system for cooling a battery is mounted on the vehicle such as an electric vehicle.

Generally, this battery cooling system includes an intake duct and a cooling fan. The intake duct is interposed between a vehicle cabin and the battery outside of the vehicle cabin. The cooling fan is disposed in the intake duct. The cooling fan takes in inside air of the air-conditioned vehicle cabin to the intake duct and sends the air to the battery side so as to cool the battery. In order to prevent air of a higher temperature than the battery from being sent to heat the battery, a battery temperature and a temperature of air flowing through the intake duct (that is, an intake air temperature) are each detected by a sensor, and intake air temperature check is performed to determine whether to start cooling the battery with the cooling fan (see, for example, Japanese Unexamined Patent Application Publication (JP-A) No. 2018-95061).

In such a battery cooling system, when the cooling fan is stopped, the air is stagnant in the intake duct. In view of this, after discharging the air from the intake duct and taking in the inside air of the vehicle cabin to the intake duct, the intake air temperature check is performed to compare the battery temperature and the intake air temperature with each other.

A battery cooling system disclosed in JP-A No. 2018-95061 adopts a method for intake air temperature check control to check an intake air temperature. In the method, when a battery has a high temperature, a cooling fan is continuously driven to send air of an amount corresponding to a volume of an intake duct. After the air of the amount corresponding to the volume of the intake duct is sent, the intake air temperature in the intake duct and a battery temperature are obtained to compare the intake air temperature and the battery temperature with each other. When the intake air temperature is lower than the battery temperature, cooling of the battery is started.

In the battery cooling system disclosed in JP-A No. 2018-95061, the inside air of the intake duct is sent at once to perform intake air temperature check so that the intake air temperature check can be ended at an early stage to quickly start cooling of the battery.

SUMMARY

An aspect of the disclosure provides a battery cooling system including a cooling fan, a battery temperature sensor, an intake air temperature sensor, and a controller. The cooling fan is configured to take in inside air of a vehicle cabin to an intake passage and send the air to a battery. The vehicle cabin and the battery communicate with each other through the intake passage. The battery temperature sensor is configured to detect a temperature of the battery. The intake air temperature sensor is disposed in the intake passage. The intake air temperature sensor is configured to detect a temperature of the air flowing through the intake passage. The controller is configured to control operation of the cooling fan on a basis the temperature detected by the intake air temperature sensor and the temperature detected by the battery temperature sensor. The controller is configured to perform a temperature check operation of: operating the cooling fan to send the air to the battery, and thereafter stopping the cooling fan, and calculating a difference value by subtracting the temperature detected by the battery temperature sensor from the temperature detected by the intake air temperature sensor. When the difference value is larger than zero, the controller repeats the temperature check operation. In the temperature check operation from a second time onward, when (i) the difference value in the latest round of the temperature check operation is smaller than the difference value in a previous round of the temperature check operation and (ii) the difference value in the latest round of the temperature check operation is larger than zero, the controller performs a next round of the temperature check operation.

An aspect of the disclosure provides a battery cooling system including a cooling fan, a battery temperature sensor, an intake air temperature sensor, and circuitry. The cooling fan is configured to take in inside air of a vehicle cabin to an intake passage and send the air to a battery. The vehicle cabin and the battery communicate with each other through the intake passage. The battery temperature sensor is configured to detect a temperature of the battery. The intake air temperature sensor is disposed in the intake passage. The intake air temperature sensor is configured to detect a temperature of the air flowing through the intake passage. The circuitry is configured to control operation of the cooling fan on a basis the temperature detected by the intake air temperature sensor and the temperature detected by the battery temperature sensor. The circuitry is configured to perform a temperature check operation of: operating the cooling fan to send the air to the battery, and thereafter stopping the cooling fan, and calculating a difference value by subtracting the temperature detected by the battery temperature sensor from the temperature detected by the intake air temperature sensor. When the difference value is larger than zero, the circuitry repeats the temperature check operation. In the temperature check operation from a second time onward, when (i) the difference value in the latest round of the temperature check operation is smaller than the difference value in a previous round of the temperature check operation and (ii) the difference value in the latest round of the temperature check operation is larger than zero, the circuitry performs a next round of the temperature check operation.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Figure 5:
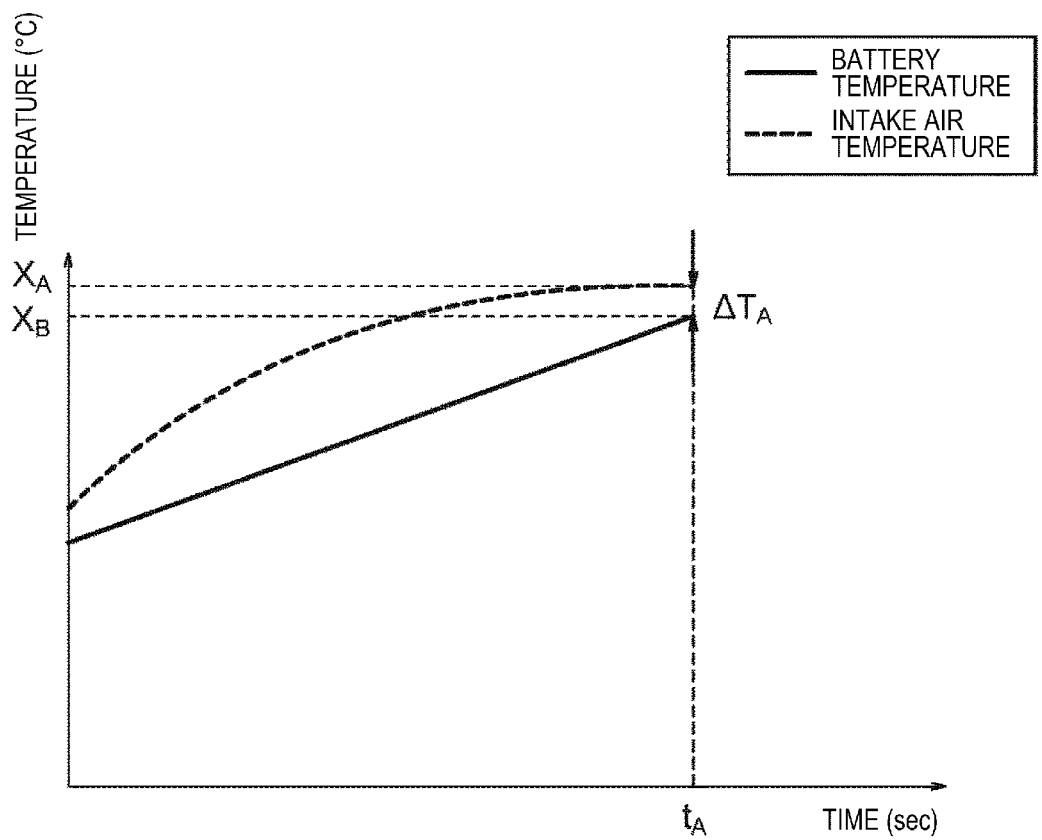
FIG. 5 is a graph illustrating changes over time in battery temperature and intake air temperature when intake air temperature check is performed in a battery cooling system of related art.

FIG. 5 is a graph illustrating an example of the intake air temperature check control in the battery cooling system disclosed in JP-A No. 2018-95061. In FIG. 5, a vertical axis represents the intake air temperature and the battery temperature. A solid line indicates a change in the battery temperature over time, and a dashed line indicates a change in the intake air temperature over time. As described above, in the battery cooling system disclosed in JP-A No. 2018-95061, the intake air temperature check can be ended at an early stage. However, the vehicle may be left to stand under a burning sun and the intake duct may have a high temperature. In this case, as indicated with the solid line in FIG. 5, when the cooling fan is operated to send the air of the amount corresponding to the volume of the intake duct at once in order to perform the intake air temperature check, high-temperature air inside the intake duct may be sent to the battery side in such a rush that the battery temperature may sharply increase to cause overheating.

Even when the air of the amount corresponding to the volume of the intake duct is discharged, the inside air of the vehicle cabin that has flowed through the intake duct at high temperature may be consequently heated and have a higher temperature than a vehicle cabin temperature. In this case, as illustrated in FIG. 5, an intake air temperature $X_A$ detected by an intake air temperature sensor may be higher than a battery temperature $X_B$ detected by a battery temperature sensor. It is noted that ATA in FIG. 5 represents a difference obtained by subtracting the battery temperature $X_B$ from the intake air temperature $X_A$. In this manner, in the intake air temperature check of the related art, even though the temperature of the air inside of the vehicle cabin is lower than the battery temperature, drive of the cooling fan may be stopped after the intake air temperature check, which may hinder appropriate cooling of the battery.

It is desirable to provide a battery cooling system that makes it possible to start cooling of a battery while preventing heating of the battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
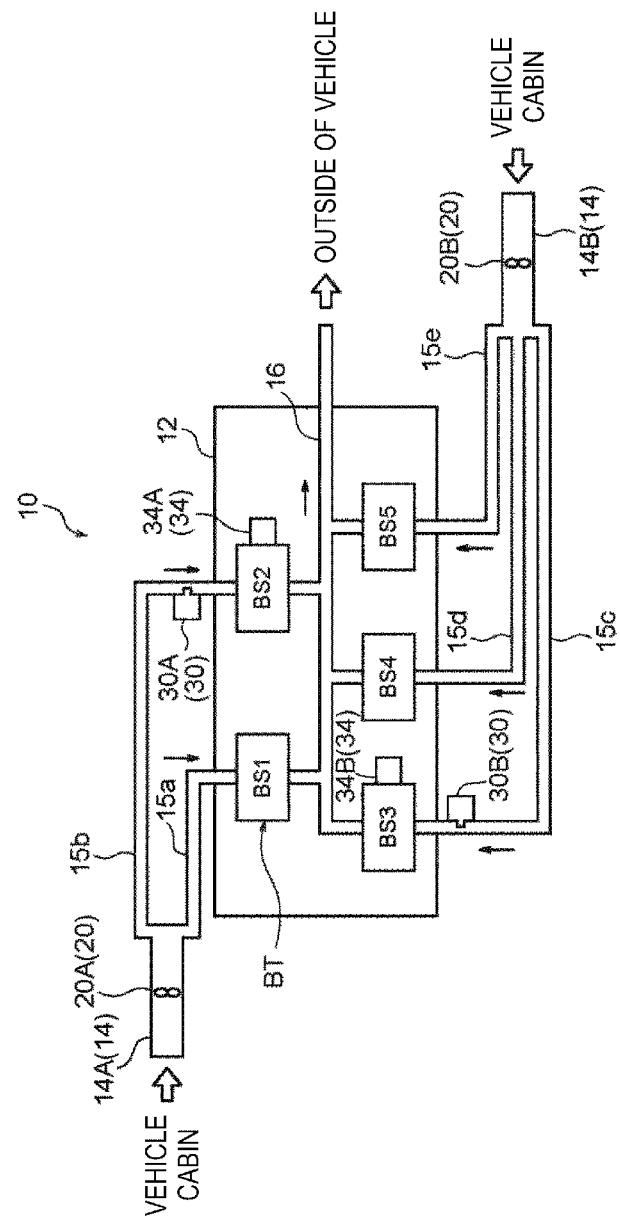
FIG. 1 is a schematic diagram illustrating a battery cooling system according to an embodiment of the disclosure.
Figure 2:
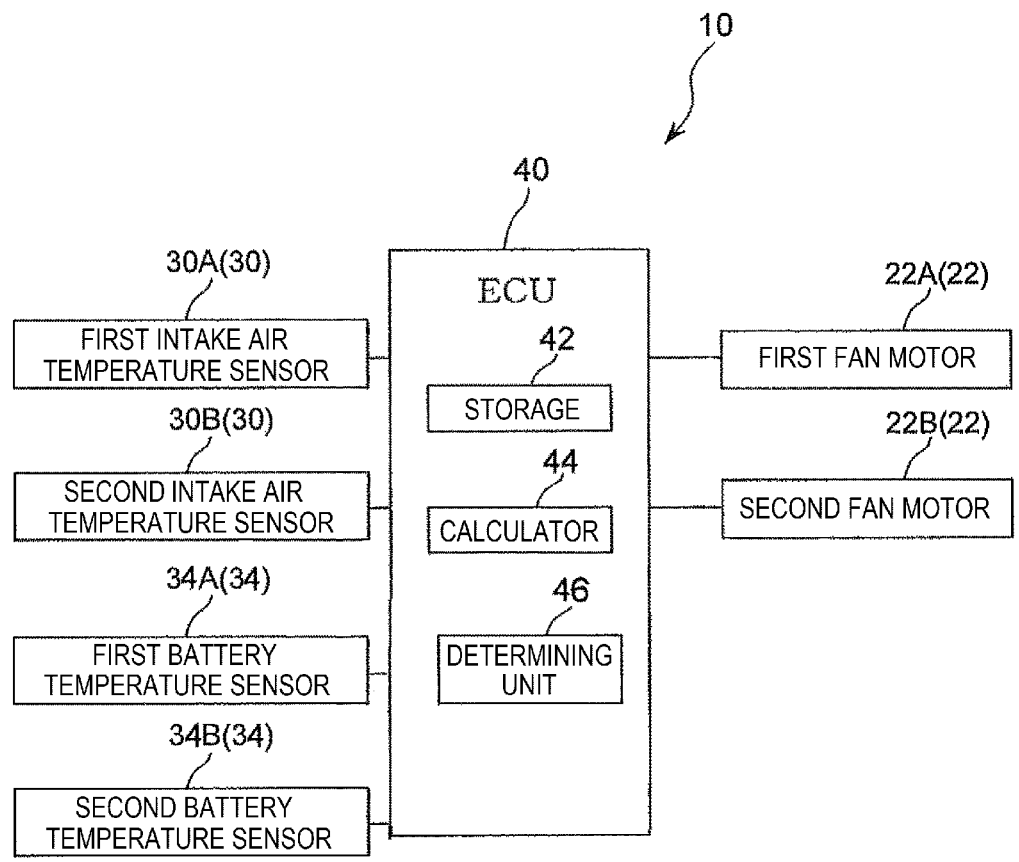
FIG. 2 is a diagram illustrating a control mechanism of the battery cooling system.

FIG. 1 is a schematic diagram illustrating a battery cooling system according to an embodiment of the disclosure. FIG. 2 is a diagram illustrating a control mechanism of the battery cooling system. A battery cooling system 10 according to the embodiment of the disclosure is employed in a vehicle that uses a battery BT as a drive source. Examples of the vehicle include an electric vehicle, a hybrid vehicle, and a plug-in hybrid vehicle.

The battery cooling system 10 includes the battery BT, intake ducts 14, cooling fans 20, and an exhaust duct 16. The battery BT is mounted on the vehicle. The intake ducts 14 form intake passages through which a vehicle cabin and the battery BT communicate with each other. The cooling fans 20 take in inside air of the vehicle cabin to the intake ducts 14 and send the air to the battery BT. The exhaust duct 16 discharges, out of the vehicle, the air sent to the battery BT. The battery cooling system 10 also includes intake air temperature sensors 30, battery temperature sensors 34, and an electronic control unit (ECU) 40. The intake air temperature sensors 30 detect temperature of the air that flows through the intake passages (hereinafter also referred to as an "intake air temperature"). The battery temperature sensors 34 detect temperature of the battery BT. In one example, the ECU 40 may serve as a controller.

The battery BT is accommodated in a battery pack 12 formed outside of the vehicle cabin. The battery pack 12 may be disposed, for example, below a baggage compartment at a rear portion of the vehicle. In this embodiment, the battery BT includes five battery stacks, namely, a first battery stack BS1, a second battery stack BS2, a third battery stack BS3, a fourth battery stack BS4, and a fifth battery stack BS5. Battery cells to generate electricity are stacked to constitute each of the battery stacks BS1 to BS5.

The vehicle cabin and an inside of the battery pack 12 where the battery BT is accommodated communicate with each other through the intake ducts 14. In this embodiment, a downstream side of each of the intake ducts 14 branches off into a plurality of pipe lines to send the inside air of the vehicle cabin to the battery stacks BS1 to BS5. For example, the two intake ducts 14A and 14B are interposed between the vehicle cabin and the battery pack 12. The first intake duct 14A branches off downstream into two branched pipes 15a and 15b. The first branched pipe 15a is coupled to the first battery stack BS1, and the second branched pipe 15b is coupled to the second battery stack BS2. The second intake duct 14B branches off downstream into three branched pipes 15c, 15d, and 15e. The first branched pipe 15c is coupled to the third battery stack BS3, the second branched pipe 15d is coupled to the fourth battery stack BS4, and the third branched pipe 15e is coupled to the fifth battery stack BS5.

The cooling fans 20 are driven by fan motors 22 coupled to the ECU 40, and supply the inside air of the vehicle cabin to the battery BT. The cooling fans 20 are disposed in the respective intake ducts 14. In this embodiment, the first cooling fan 20A is disposed in the first intake duct 14A, and the second cooling fan 20B is disposed in the second intake duct 14B. The first cooling fan 20A and the second cooling fan 20B may be individually driven by the first fan motor 22A and the second fan motor 22B, respectively. In an illustrated example, the cooling fans 20 are disposed on the intake duct 14 side so as to expel inside air of the ducts out of the vehicle. However, the cooling fans 20 may be disposed on the exhaust duct 16 side so as to draw inside air of the duct out of the vehicle.

The exhaust duct 16 forms an exhaust passage to discharge, out of the vehicle, the air sent to the battery BT via the intake ducts 14. In this embodiment, an upstream end portion of the exhaust duct 16 branches off to be coupled to each of the first to fifth battery stacks BS1 to BS5.

The intake air temperature sensors 30 are disposed in the intake passages and detect temperature Ta of the air flowing through the intake ducts 14 (hereinafter referred to also as an "intake air temperature Ta"). In some embodiments, considering a temperature change in the intake passages, an influence on the battery BT, and other factors, the intake air temperature sensors 30 are disposed in regions of the intake passages that are close to the battery pack 12. The battery cooling system 10 according to this embodiment includes the two intake air temperature sensors 30, namely, the first intake air temperature sensor 30A disposed at the first intake duct 14A in the vicinity of the second battery stack BS2, and the second intake air temperature sensor 30B disposed at the second intake duct 14B in the vicinity of the third battery stack BS3.

The battery temperature sensors 34 detect temperature Tb of the battery BT (hereinafter referred to also as a "battery temperature Tb"). The battery temperature sensors 34 are disposed inside of the battery pack 12 or on a surface of the battery pack 12, and directly or indirectly detect the temperature of the battery BT. In this embodiment, the first battery temperature sensor 34A and the second battery temperature sensor 34B are respectively attached to the second battery stack BS2 and the third battery stack BS3 to which the intake ducts 14A and 14B have passages so long that temperature in the ducts is likely to be highest.

The ECU 40 controls the battery cooling system 10 and other devices mounted on the vehicle. The ECU 40 includes, for example, information processing units, such as a central processing unit (CPU) and an application specific integrated circuit (ASIC), storage units, such as a RAM and a ROM, and an input/output interface. The ECU 40 according to this embodiment controls operation of the cooling fans 20 based on temperatures detected by the intake air temperature sensors 30 and the battery temperature sensors 34. The ECU 40 is electrically connected to each of the temperature sensors 30A, 30B, 34A, and 34B, and each of the fan motors 22A and 22B.

Control of the cooling fans 20 by the ECU 40 can be performed to control the cooling fans 20A and 20B simultaneously based on maximum temperatures detected by the intake air temperature sensors 30A and 30B and maximum temperatures detected by the battery temperature sensors 34A and 34B. Instead of these maximum temperatures, the cooling fans 20A and 20B may be individually controlled respectively by the intake air temperature sensors 30A and 30B and the battery temperature sensors 34A and 34B disposed in the passages from the intake ducts 14A and 14B to the exhaust duct 16. Control operation by the ECU 40 will be described below in which the cooling fans 20A and 20B are simultaneously controlled using the maximum temperatures detected by the temperature sensors.

The ECU 40 includes a storage 42 to store predetermined information concerning intake air temperature check control and battery cooling control after the intake air temperature check control. The ECU 40 further includes a calculator 44 and a determining unit 46. The calculator 44 calculates a difference value $\Delta T_N$ by subtracting the battery temperature Tb from the intake air temperature Ta. The determining unit 46 determines subsequent operation based on the information in the storage 42, detection results by the sensors, and a calculation result by the calculator 44. N in the difference value $\Delta T_N$ represents a positive integer (N=1, 2, ..., m) that varies in accordance with the number of temperature check operations, described later.

In the storage 42, a battery cooling reference temperature $Tb_{th}$ is set to serve as a reference at which the battery BT is to be cooled in the battery cooling system 10. In one example, the battery cooling reference temperature $Tb_{th}$ may be set at 36° C.

In the storage 42, control values are set in advance to control rotation of the cooling fans 20 in the intake air temperature check control. As illustrated in Table 1, each of the control values includes a combination of a duty ratio $D_n$ (unit: %) of PWM control (control of repeatedly switching on and off in a predetermined cycle) of the cooling fans 20, and time $t_n$ (unit: sec) to operate the cooling fans 20 at the duty ratio $D_n$. "n" represents a positive integer that varies in accordance with the number of temperature check operations, described later, and is set in such a manner that as "n" increases, values of the duty ratio and the time increase. A rotational speed (unit: rpm) of the cooling fans 20 at each duty ratio may be set to be constant or increase as the duty ratio increases. Moreover, the storage 42 stores the difference value $\Delta T_N$ calculated by the calculator 44.

TABLE 1

| N | 1 | 2 | 3 | 4 | ... | |
|---|---|---|---|---|---|---|
| $t_n$ (sec) | $t_1$ | $t_2$ | $t_3$ | $t_4$ | ... | ($t_1 < t_2 < t_3 < t_4 < ...$) |
| $D_n$ (%) | $D_1$ | $D_2$ | $D_3$ | $D_4$ | ... | ($D_1 < D_2 < D_3 < D_4 < ...$) |

In the intake air temperature check control, when the intake air temperature Ta is higher than the battery temperature Tb, the ECU 40 performs the following series of operations: driving the cooling fans 20 at the predetermined duty ratio $D_n$ for the predetermined time $t_n$ to send air to the battery BT; thereafter stopping the cooling fans 20 for predetermined time $t_x$ to detect the intake air temperature Ta and the battery temperature Tb; and calculating the difference value $\Delta T_N$ by subtracting the battery temperature Tb from the intake air temperature Ta. In this specification, this series of operations is referred to as a "temperature check operation". In the battery cooling system 10 according to this embodiment, in a temperature check operation from a second time onward, when (i) the latest difference value $\Delta T_N$ is larger than zero and (ii) the difference value $\Delta T_N$ in the latest temperature check operation is smaller than a difference value $\Delta T_{N-1}$ in a previous temperature check operation, an amount of the air sent to the battery BT in a next temperature check operation (that is, from a third time onward) is made larger than in the latest temperature check operation. In some embodiments, the amount of the air sent to the battery BT in the temperature check operation is smaller than a volume of the intake ducts 14. In this embodiment, the amount of the air sent to the battery BT is set to make the amount of the sent air is smaller than the volume of the intake ducts 14 in each of at least the first to third temperature check operations. It is noted that the amount of the air sent to the battery BT by the cooling fans 20 in each of the temperature check operations may be set as suited. For example, the amount of the sent air may be the same each time (that is, the amount of the sent air in each of the third and onward temperature check operations may be the same as in the first temperature check operation), and the amount of the sent air may be different each time.

Figure 3A:
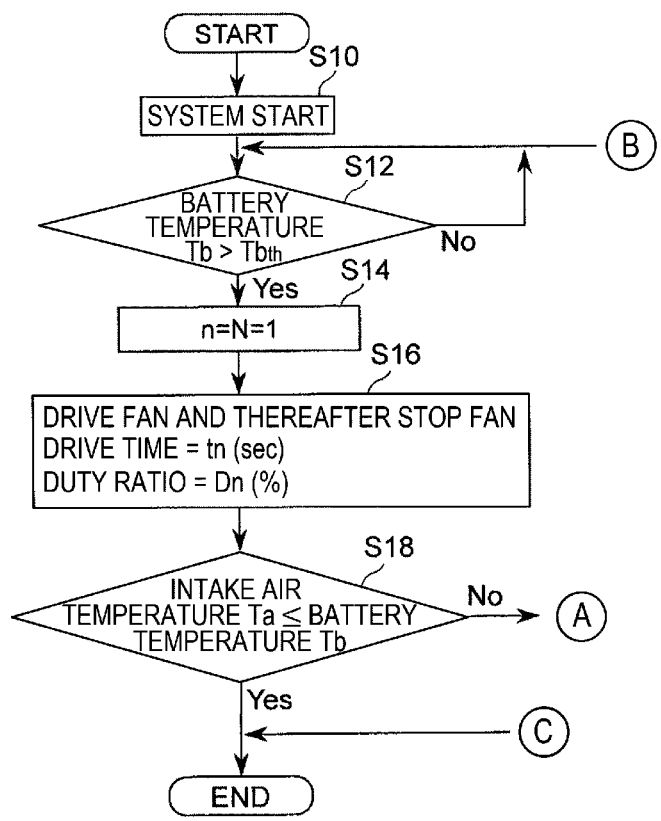
FIGS. 3A and 3B are flowcharts illustrating intake air temperature check control performed by a controller.
Figure 3B:
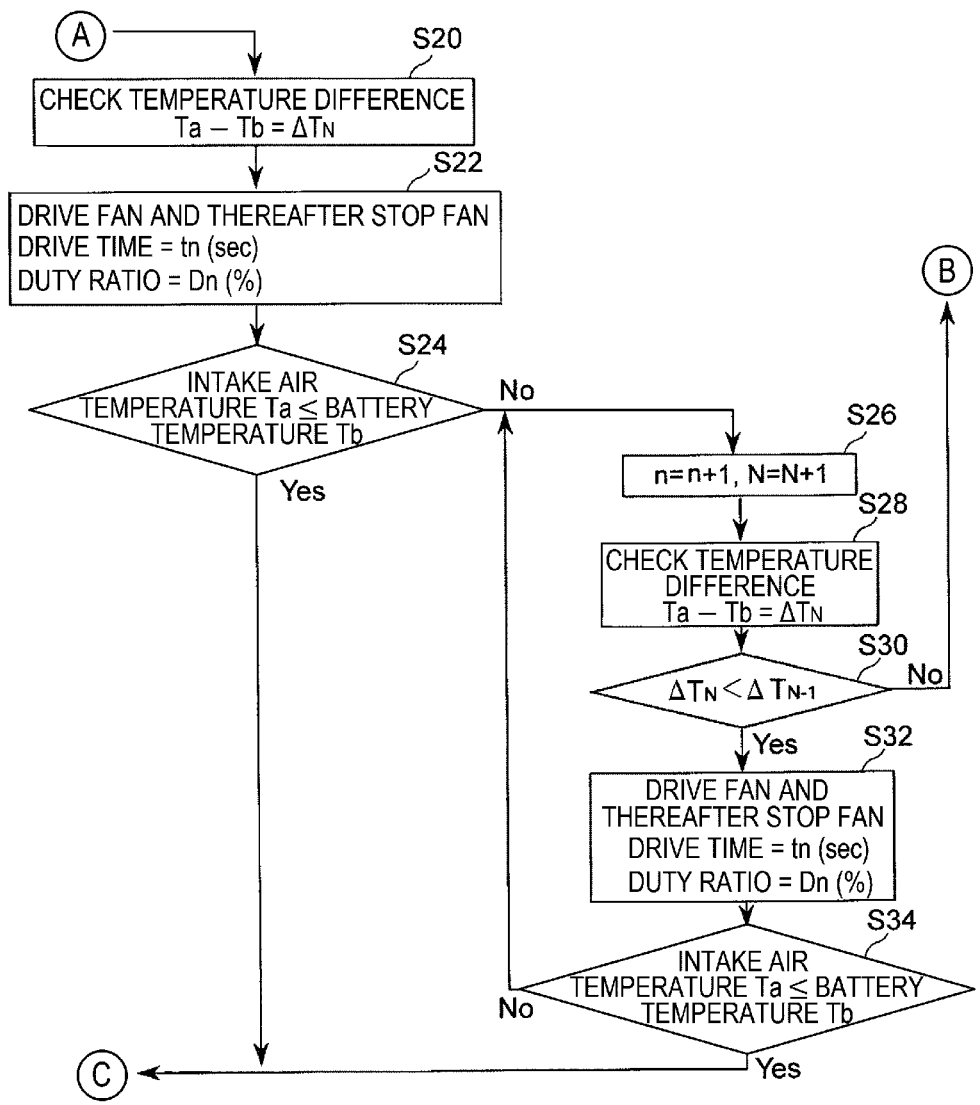

Next, referring to flowcharts of FIGS. 3A and 3B, the intake air temperature check control performed by the ECU 40 will be described.

First, when the ECU 40 detects that the vehicle with the battery cooling system 10 aboard is being driven by a drive source and is capable of traveling, that is, that the system has been started up (step S10), the ECU 40 determines whether the battery temperature Tb has exceeded the battery cooling reference temperature $Tb_{th}$ (step S12). When the battery temperature Tb is equal to or less than the battery cooling reference temperature $Tb_{th}$, determination at step S12 is continuously repeated (No at step S12).

When the battery temperature Tb has exceeded the battery cooling reference temperature $Tb_{th}$ (Yes at step S12), the ECU 40 sets each of a parameter n and a parameter N at 1 (n=N=1) and proceeds to a next process (step S14). The parameter n is the control value of the cooling fans 20, and the parameter N is a parameter of the difference value $\Delta T_N$ calculated by the calculator 44.

At the next process (step S16), based on the control value stored in the storage 42, the ECU 40 drives the cooling fans 20 at a predetermined duty ratio $D_1$ for predetermined time $t_1$ and thereafter stops the cooling fans 20. When predetermined time $t_x$ has elapsed after stopping the cooling fans 20, the ECU 40 determines whether the intake air temperature Ta is equal to or less than the battery temperature Tb (that is, whether a difference value obtained by subtracting the battery temperature Tb from the intake air temperature Ta is equal to or less than zero) (step S18). In one embodiment, operations from step S16 to step S18 may correspond to the first temperature check operation.

When the intake air temperature Ta is equal to or less than the battery temperature Tb (Yes at step S18), cooling of the battery BT is possible so that the ECU 40 ends the intake air temperature check control (END). Then, based on the preset control value of the battery cooling control in the storage 42, the ECU 40 drives the cooling fans 20 to start to cool the battery BT.

At step S18, when the intake air temperature Ta is higher than the battery temperature Tb (No at step S18), the ECU 40 causes the storage 42 to store a difference value $\Delta T_1$ obtained by subtracting the battery temperature Tb from the intake air temperature Ta (step S20). Next, the ECU 40 drives the cooling fans 20 at the predetermined duty ratio $D_1$ for the predetermined time $t_1$ again and thereafter stops the cooling fans 20 (step S22). When the predetermined time $t_x$ has elapsed after stopping the cooling fans 20, the ECU 40 determines whether the intake air temperature Ta is equal to or less than the battery temperature Tb (step S24). In one embodiment, operations from step S22 to step S24 may correspond to the second temperature check operation.

When the intake air temperature Ta is equal to or less than the battery temperature Tb (Yes at step S24), the ECU 40 ends the intake air temperature check control and drives the cooling fans 20 based on the preset control value of the battery cooling control in the storage 42, thus starting to cool the battery BT.

At step S24, when the intake air temperature Ta is higher than the battery temperature Tb (No at step S24), the ECU 40 adds 1 to each of the parameter n, which is the control value of the cooling fans 20, and the parameter N of the difference value $\Delta T_N$ calculated by the calculator 44 (n=n+1, N=N+1) (step S26). The ECU 40 causes the storage 42 to store a difference value $\Delta T_2$ obtained by subtracting the battery temperature Tb from the intake air temperature Ta (step S28), and proceeds to a next process.

At the next step S30, the ECU 40 determines whether the difference value $\Delta T_2$ calculated this time is smaller than the difference value $\Delta T_1$ in the previous temperature check operation (in this case, the first temperature check operation).

When the difference value $\Delta T_2$ calculated this time is equal to or larger than the previous difference value $\Delta T_1$ (No at step S30), air at a higher temperature than the battery BT may be sent to erroneously heat the battery BT. Consequently, the ECU 40 resets the intake air temperature check control that has been performed so far and resumes the intake air temperature check control from step S12. After resetting, the parameter n and the parameter N restart from 1 at step S14.

When the difference value $\Delta T_2$ calculated this time is smaller than the previous difference value $\Delta T_1$ (Yes at step S30), the ECU 40 drives the cooling fans 20 at a predetermined duty ratio $D_2$ higher than a previous value for predetermined time $t_2$ so as to expel heated air out of the intake ducts 14, and thereafter the ECU 40 stops the cooling fans 20 (step S32). When the predetermined time $t_x$ has elapsed after stopping the cooling fans 20, the ECU 40 determines whether the intake air temperature Ta is equal to or less than the battery temperature Tb (step S34). In one embodiment, operations from step S32 to step S34 may correspond to the third temperature check operation.

At step S34, when the intake air temperature Ta is equal to or less than the battery temperature Tb (Yes at step S34), the ECU 40 ends the intake air temperature check control and drives the cooling fans 20 based on the preset control value of the battery cooling control in the storage 42, thus starting to cool the battery BT.

At step S34, when the intake air temperature Ta is higher than the battery temperature Tb (No at step S34), the ECU 40 returns to step S26 and adds 1 to each of the parameter n, which is the control value of the cooling fans 20, and the parameter N of the difference value $\Delta T_N$ calculated by the calculator 44 (n=n+1, N=N+1). In this case, the ECU 40 adds 1 to each of the parameters n=N=2 and sets n=N=3. Thereafter, the ECU 40 proceeds to a process of step S28 and continues to perform processes that follow. As illustrated in a flow from step S26 to step S34 in FIG. 3B, when the battery temperature Tb is higher than the battery cooling reference temperature $Tb_{th}$, the intake air temperature check control is continued until the intake air temperature Ta becomes equal to or less than the battery temperature Tb. Each time the number of temperature check operations increases, 1 is added to the parameter n and the parameter N. Based on the variables, PWM control of the cooling fans 20 is performed.

As described above, the intake air temperature check control of the battery cooling system 10 according to this embodiment is performed in such a manner that in the temperature check operation from the third time onward, the amount of the air sent to the battery BT by the cooling fans 20 is made larger than in the previous temperature check operation. That is, supposing that this time is an Nth time, operation of the cooling fans 20 is controlled to make the amount of the sent air larger than in the previous temperature check operation for an (N−1)th time. In this embodiment, the ECU 40 increases the drive time $t_n$ of the cooling fans 20 and increases the duty ratio $D_n$ of the cooling fans 20 so as to increase the amount of the sent air in the temperature check operation.

Figure 4A:
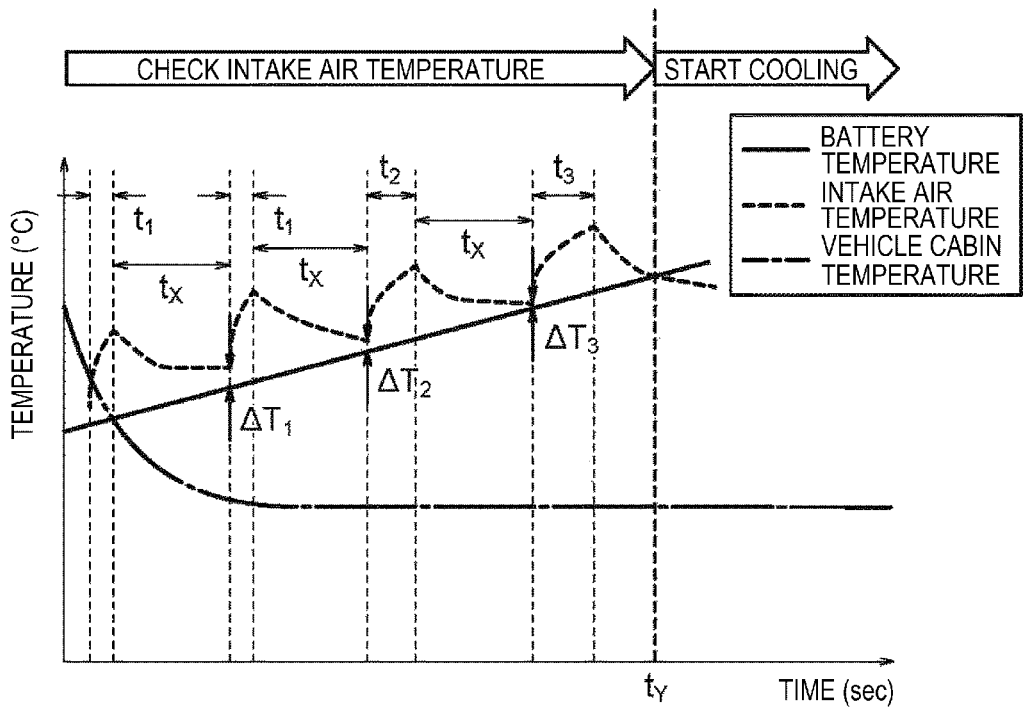
FIG. 4A is a graph illustrating changes over time in battery temperature, intake air temperature, and vehicle cabin temperature.
Figure 4B:
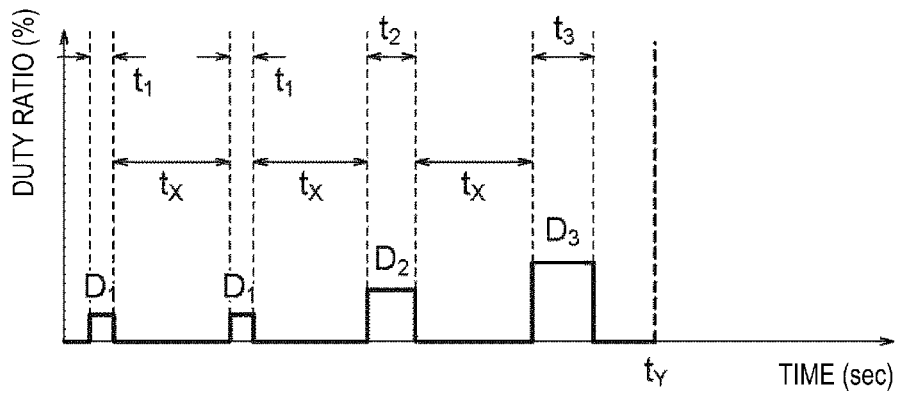
FIG. 4B is a graph illustrating changes over time in duty ratio of cooling fans.

FIG. 4A and FIG. 4B are graphs illustrating an example in which the temperature check operation is performed four times in the intake air temperature check control. FIG. 4A is a graph illustrating changes over time in the battery temperature Tb, the intake air temperature Ta, and a vehicle cabin temperature. FIG. 4B is a graph illustrating changes over time in the duty ratio of the cooling fans 20. It is noted that the vehicle cabin temperature may be detected by a vehicle cabin temperature sensor disposed inside of the vehicle cabin or in an end portion of the intake ducts 14 on the vehicle cabin side. Time axes (horizontal axes) of FIG. 4A and FIG. 4B coincide with each other.

Suppose, for example, that the vehicle is left to stand under a burning sun, and that the intake ducts 14 have high temperature. In such a situation, as illustrated in FIG. 4A, even when air conditioning makes the vehicle cabin temperature lower than the battery temperature Tb, the intake air temperature Ta of the air flowing through the intake ducts 14 may be higher than the battery temperature Tb in some cases. In such cases, when the intake air temperature check control is performed to rotate the cooling fans 20 at a rotational speed lower than at the time of battery cooling, the high-temperature air stagnant in the intake ducts 14 is sent to increase the intake air temperature detected by the intake air temperature sensors 30 disposed in the vicinity of outlets of the intake ducts 14. At this time, as in the intake air temperature check control of the related art illustrated in FIG. 5, when the cooling fans 20 are continuously driven to discharge air of an amount corresponding to the volume of the intake ducts 14 at once, the high-temperature air is sent to the battery BT in such a rush as to sharply increase the battery temperature Tb, which may cause overheating.

In contrast, in the battery cooling system 10 according to this embodiment, as illustrated in FIG. 4B, the cooling fans 20 are driven and stopped repeatedly so that an amount of the air sent in a single event of drive is made smaller than the amount corresponding to the volume of the intake ducts 14. Consequently, even when the high-temperature air is stagnant in the intake passages, the high-temperature air can be prevented from being sent to the battery BT at once and sharply increasing the battery temperature Tb.

Furthermore, in the battery cooling system 10 according to this embodiment, as illustrated in FIG. 4A and FIG. 4B, when the difference value $\Delta T_N$ obtained by subtracting the battery temperature Tb from the intake air temperature Ta is smaller than the difference value $\Delta T_{N-1}$ in the previous temperature check operation, operation of the cooling fans 20 is controlled to make the duty ratio $D_n$ of the cooling fans 20 higher than a previous duty ratio $D_{n-1}$ and make the drive time $t_n$ of the cooling fans 20 longer than previous drive time $t_{n-1}$. Even though the difference value $\Delta T_N$ is larger than zero, when the air temperature in the vehicle cabin is lower than the battery temperature Tb, the cooling fans 20 continue to send the air to gradually decrease the difference value $\Delta T_N$. Consequently, in the temperature check operation from the second time onward, when the calculated difference value $\Delta T_N$ is smaller than the difference value $\Delta T_{N-1}$ in the previous temperature check operation, the amount of air in a next temperature check operation is made larger than the amount of air sent this time so that time can be shortened until the difference value becomes equal to or less than zero (that is, until the intake air temperature Ta becomes equal to or less than the battery temperature Tb to enable the cooling fans 20 to cool the battery BT). Thus, the intake air temperature check control can be ended at an early stage so that when the vehicle cabin temperature is lower than the battery temperature Tb, cooling of the battery BT can be started quickly. It is noted that as illustrated in FIG. 4A, the difference value $\Delta T_N$ may be continuously detected, and at a timing (time ty) when the difference value $\Delta T_N$ becomes equal to or less than zero, battery cooling control after the intake air temperature check control may be started.

In the battery cooling system 10 according to the embodiment of the disclosure, when the temperature check operation is repeated a plurality of times, the amount of the air sent by the cooling fans 20 may be increased by simply increasing the duty ratio $D_n$ while keeping the drive time $t_n$ constant or by simply increasing the drive time $t_n$ while keeping the duty ratio $D_n$ constant or by increasing the rotational speed of the cooling fans 20 while keeping the duty ratio $D_n$ and the drive time $t_n$ constant. However, as in the above-described embodiment, both of the duty ratio $D_n$ and the drive time $t_n$ are increased to increase the amount of the sent air each time the number of the temperature check operations increases so that the intake air temperature check control can be ended at an early stage to start to cool the battery BT more quickly.

In the intake air temperature check control, when (i) the difference value $\Delta T_N$ calculated in the temperature check operation from the second time onward is larger than zero, and (ii) the difference value $\Delta T_N$ is equal to or larger than the difference value $\Delta T_{N-1}$ in the previous temperature check operation, the air temperature in the vehicle cabin may be higher than the battery temperature Tb, and the battery BT may be erroneously heated by driving the cooling fans 20. Therefore, in such a case, the intake air temperature check control is reset to hinder cooling of the battery BT by the cooling fans 20 (that is, continuous drive of the cooling fans 20) so that erroneous heating of the battery BT can be prevented.

It is noted here that the embodiment of the disclosure is not limited to the foregoing embodiment, and that various modifications and alterations can be made thereto within the gist of the disclosure.

According to the embodiment of the disclosure, when the difference value obtained by subtracting the battery temperature from the intake air temperature is larger than zero, the controller repeats the temperature check operation to repeatedly operate and stop the cooling fans so as to avoid a situation in which the battery is not cooled even though the air temperature in the vehicle cabin is lower than the battery temperature. Even though the difference value is larger than zero, when the air temperature in the vehicle cabin is lower than the battery temperature, the cooling fans continue to send the air to gradually decrease the difference value. Consequently, in the temperature check operation from the second time onward, when the calculated difference value is smaller than the difference value in the previous temperature check operation, the next temperature check operation is performed so that time can be shortened until the difference value becomes equal to or less than zero (that is, until the cooling fans can cool the battery) while preventing heating of the battery. Thus, the temperature check control can be ended at an early stage to allow cooling of the battery to start.

According to the embodiment of the disclosure, in the temperature check operation from the second time onward, when the difference value calculated in the latest temperature check operation is smaller than the difference value in the previous temperature check operation, the amount of sent air in the next temperature check operation is made larger than the latest amount of sent air so that time can be shortened until the cooling fans can cool the battery (that is, until the difference value calculated in the temperature check operation becomes equal to or less than zero). Thus, the temperature check control can be ended at an early stage to allow cooling of the battery to start.

According to the embodiment of the disclosure, the duty ratio of the cooling fans and the drive time of the cooling fans are increased so that the amount of the sent air in the next temperature check operation can be made larger than the latest amount of sent air.

According to the embodiment of the disclosure, when the difference value in the latest temperature check operation is equal to or larger than in the previous temperature check operation, that is, when the battery may be erroneously heated by operating the cooling fans, the temperature check control is reset so that erroneous heating can be prevented.

The battery cooling system according to the embodiment of the disclosure makes it possible to start cooling of the battery while preventing heating of the battery.

The invention claimed is:

1. A battery cooling system comprising:
    a cooling fan configured to take in inside air of a vehicle cabin to an intake passage and send the air to a battery, the vehicle cabin and the battery communicating with each other through the intake passage;
    a battery temperature sensor configured to detect a temperature of the battery;
    an intake air temperature sensor disposed in the intake passage, the intake air temperature sensor being configured to detect a temperature of the air flowing through the intake passage; and
    a controller that controls an operation of the cooling fan on a basis of the temperature detected by the intake air temperature sensor and the temperature detected by the battery temperature sensor,
    wherein the operation includes a temperature check operation executed by the controller, the temperature check operating including:
        operating the cooling fan to send the air to the battery; and
        thereafter stopping the cooling fan, and calculating a difference value by subtracting the temperature detected by the battery temperature sensor from the temperature detected by the intake air temperature sensor,
    wherein when the difference value is larger than zero, the controller repeats the temperature check operation, and
    wherein, in the temperature check operation from a second time onward, the controller performs a next round of the temperature check operation when:
        the difference value in the latest round of the temperature check operation is smaller than the difference value in a previous round of the temperature check operation; and
        the difference value in the latest round of the temperature check operation is larger than zero.

2. The battery cooling system according to claim 1, wherein when the difference value in the latest round of the temperature check operation is smaller than the difference value in the previous round of the temperature check operation, the controller makes an amount of the air to be sent to the battery in the next round of the temperature check operation larger than an amount of the air sent in the latest round of the temperature check operation.

3. The battery cooling system according to claim 2, wherein the controller is configured to increase drive time of the cooling fan to increase the amount of the air to be sent in the next round of the temperature check operation.

4. The battery cooling system according to claim 2, wherein the controller is configured to increase a duty ratio of the cooling fan to increase the amount of the air to be sent in the next round of the temperature check operation.

5. The battery cooling system according to claim 3, wherein the controller is configured to increase a duty ratio of the cooling fan to increase the amount of the air to be sent in the next round of the temperature check operation.

6. The battery cooling system according to claim 1, wherein in the temperature check operation from the second time onward, when the difference value in the latest round of the temperature check operation is equal to or larger than the difference value in the previous round of the temperature check operation, the controller resets control of the temperature check operation.

7. The battery cooling system according to claim 2, wherein in the temperature check operation from the second time onward, when the difference value in the latest round of the temperature check operation is equal to or larger than the difference value in the previous round of the temperature check operation, the controller resets control of the temperature check operation.

8. The battery cooling system according to claim 3, wherein in the temperature check operation from the second time onward, when the difference value in the latest round of the temperature check operation is equal to or larger than the difference value in the previous round of the temperature check operation, the controller resets control of the temperature check operation.

9. The battery cooling system according to claim 4, wherein in the temperature check operation from the second time onward, when the difference value in the latest round of the temperature check operation is equal to or larger than the difference value in the previous round of the temperature check operation, the controller resets control of the temperature check operation.

10. The battery cooling system according to claim 5, wherein in the temperature check operation from the second time onward, when the difference value in the latest round of the temperature check operation is equal to or larger than the difference value in the previous round of the temperature check operation, the controller resets control of the temperature check operation.

11. The battery cooling system according to claim 1, wherein the controller operates the cooling fan on a basis of a result of the temperature check operation.

12. The battery cooling system according to claim 1, wherein, when the temperature detected by the intake air temperature sensor is equal to or less than the battery temperature, the cooling fan is driven based on a preset control value, thus starting to cool the battery.

* * * * *